UNITED STATES PATENT OFFICE.

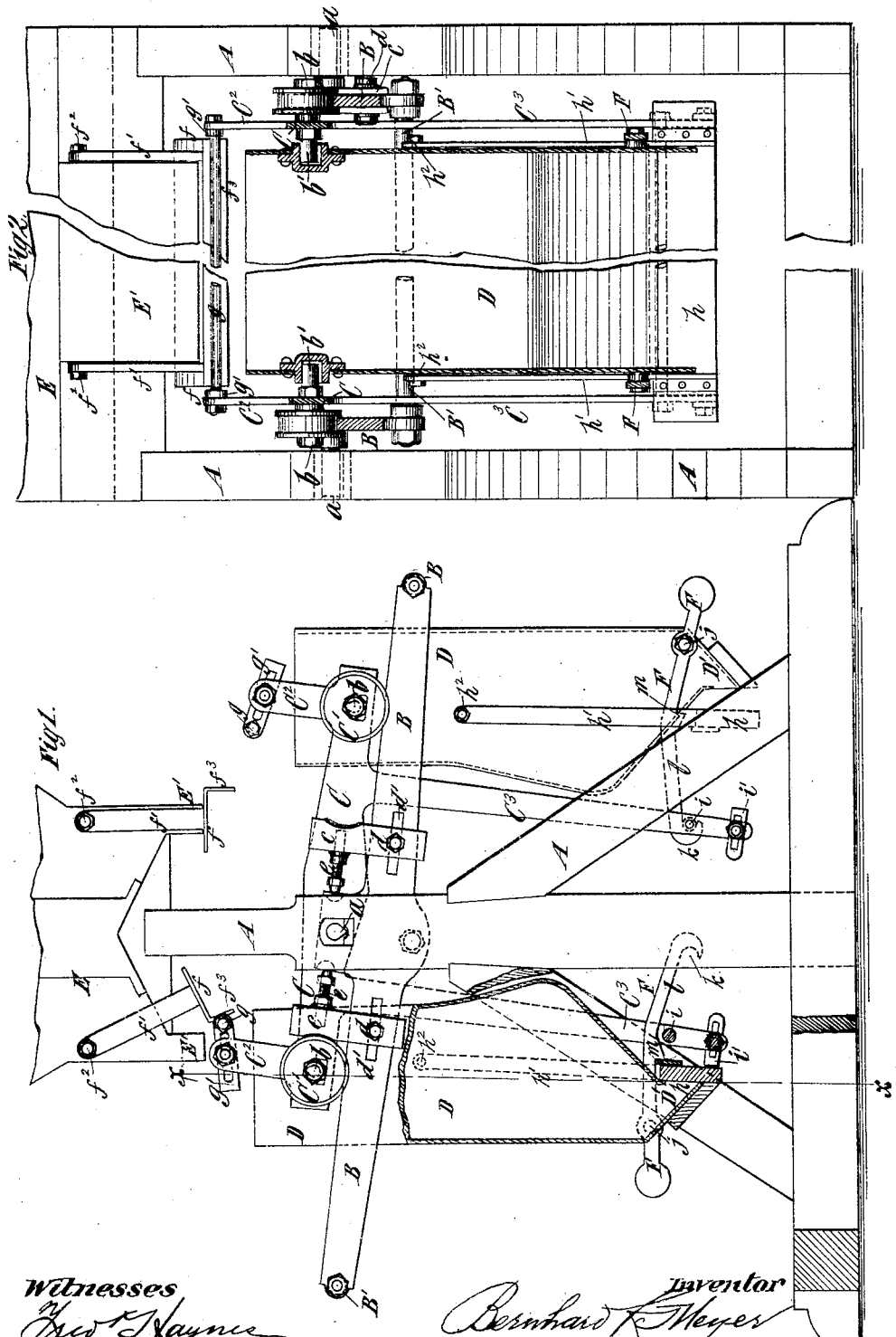

BERNHARD C. MEYER, OF BETHALTO, ILLINOIS.

AUTOMATIC SCALE.

SPECIFICATION forming part of Letters Patent No. 258,789, dated May 30, 1882.

Application filed September 21, 1881. (No model.)

*To all whom it may concern:*

Be it known that I, BERNHARD C. MEYER, of Bethalto, in the county of Madison and State of Illinois, have invented certain new and useful Improvements in Automatic Scales, of which the following is a specification.

My invention relates to automatic scales employed in weighing grain or other granulated or comminuted substances, in which two hoppers are arranged upon a vibrating beam so as to move alternately toward or away from the center of vibration of said beam, and which also comprise a stationary hopper or hoppers from which the weighing or movable hoppers receive the material to be weighed.

My invention consists in the combination, in an automatic scale, of a vibrating beam, a carriage movable upon said beam, a stationary hopper or hoppers, and two weighing or movable hoppers pivoted in said carriage, one upon each side of the center of vibration, and adapted to be brought alternately under the stationary hopper or hoppers to receive their load by the movements of the carriage upon the vibrating beam.

The invention also consists in the combination, with the vibrating beam, the carriage, the two weighing hoppers pivoted in said carriage, and the stationary hopper or hoppers, of adjustable stops for limiting the movement of said carriage in either direction, as more fully hereinafter described.

The invention also consists in the combination, with the vibrating beam and the wheeled carriage with its pivoted weighing-hoppers, of a stationary hopper provided with outlets, and swinging valves or gates, pivoted above said outlets and adapted to be swung bodily to open said outlets by the impact of said carriage or devices projecting therefrom.

The invention also consists in the combination, with the vibrating beam, the wheeled carriage, and the two weighing-hoppers pivoted in said carriage, of a novel construction and arrangement of devices for holding the outlet valves or gates of said weighing-hoppers closed and for releasing them, as hereinafter fully described.

In the accompanying drawings, Figure 1 represents a partly sectional side view of a scale embodying my invention; and Fig. 2 represents a transverse vertical section thereof upon the dotted line X X, Fig. 1, the middle portion of the scale being broken away to reduce the width of the drawing.

Similar letters of reference designate corresponding parts in both figures.

A designates the two side frames of the scale; and B B, the two side pieces of the beam, which are connected by rods or stretchers B'. The beam is supported on knife-edge bearings $a$ in the side frames A, so as to vibrate freely.

C designates a carriage, which is arranged above and within the sides B of the vibrating beam, and which is provided with wheels C', which are adapted to run upon the upper edges of the side pieces, B, of the beam, the wheels C' being flanged or otherwise constructed to keep them in place upon the said side pieces.

D designates two weighing-hoppers, which are pivoted in opposite ends of the carriage C and depend downward therefrom. In the present instance the wheels C' turn upon studs $b$, which are rigidly fastened in the sides of the carriage C, and the inwardly-projecting ends of these studs form knife-edge bearings $b'$, upon which the hoppers D are supported so as to be free to hang vertically at whatever angle the carriage C might be tilted.

In order to limit the movements of the carriage C in both directions, I employ stops, which consist, as here shown, of pieces or blocks $c$, which are secured to the sides B of the beam by means of bolts $d$, passing through slots $d'$ in the beam, whereby provision is afforded for adjusting them nearer to or farther from the center of vibration of the beam. The upper ends of the blocks or stops $c$ are supported by screws $e$, which abut at one end against an upward projection on the sides of the beam. These screws support the stops $c$ against shock when the wheels C' of the carriage C strike them, and are provided with nuts, whereby they may be adjusted in length to suit any adjustment of the stops $c$. In lieu of these stops others differently arranged might be employed.

E designates a stationary hopper, arranged over the scale and having two outlet-openings or chutes, E', or, in lieu of this arrangement, two hoppers might be employed. The outlets E' are closed by plates $f$, which constitute gates or valves, and are suspended by side bars or hangers, $f'$, which are pivoted some distance above the outlets E' at $f^2$. On the sides of the carriage C, at each end, are upward projections, $C^2$; and $g$ designates cross rods or bars, one of which is situated at each end of the carriage, and which are supported by end pieces or brackets, $g'$, from the projections $C^2$. The end pieces or brackets, $g'$, are slotted, so that they may be shifted to vary the adjustment of the cross rods or bars $g$, as may be desired. On each gate or valve $f$ is a downward projection, $f^3$, and as the beam vibrates through the alternate filling of the hoppers D, and the carriage C moves back and forth, the cross rods or bars $g$ on the end of the carriage which is moving toward the center of vibration comes in contact with the downward projection $f^3$ on one of the gates or valves $f$ and swings the latter to one side, as seen in Fig. 1, whereupon the grain or other substance flows from the stationary hopper E into the adjacent weighing-hopper D until the preponderance of weight causes the beam to tilt or vibrate and the carriage to move. The valve or gate then closes by gravity, and at the completion of the movement of the carriage the valve or gate $f$ of the other outlet E' is opened, thus making a continuous operation.

I will now describe the method of discharging the hoppers D.

Each hopper D has an outlet-opening, D', at the bottom, which is closed by a valve or gate, $h$, which stands approximately vertical, and is suspended by means of side bars or hangers, $h'$, that are pivoted, at $h^2$, to the sides of the hoppers B. Upon each side of the carriage C, and upon each side of the center of vibration, are downwardly-extending arms or bars $C^3$, each pair of which are connected by cross rods or bars $i$, and at the lower end of each arm or bar $C^3$ is an adjustable lug or projection $i'$. Upon each side of each hopper D is pivoted, at $j$, a trip-lever, F, each of which has a hook, $k$, at the end, an inclined portion, $l$, and a shoulder or catch, $m$, as seen very clearly in Fig. 1. When the beam is first tilted into the position shown the carriage C is also tilted, and the arms $C^3$, being rigidly attached, are moved simultaneously into the inclined position shown in the drawings, while the hoppers D, being pivoted, gravitate into a perpendicular position. As the hoppers D gravitate into a perpendicular position the valve or gate $h$ of the left-hand hopper strikes against the lugs or projections $i'$, and said valve is closed against the outlet D' of said hopper, which is empty, and is locked by the shoulder or catch $m$ dropping over its upper edge, as seen in Fig. 1. At the same time that the left-hand hopper D swings toward its adjacent arm $C^3$, and has its valve or gate $h$ closed, the right-hand hopper D swings away from its adjacent arm $C^3$, and the incline $l$ upon the trip-lever F rides upon the cross rod or bar $i$ and is raised sufficiently to disengage its shoulder or catch $m$ from the valve or gate $h$, whereupon the latter is forced open by the weight of material within the hopper and its contents are discharged.

Any suitable counter or registering device may be applied to the scale.

I provide a scale which is perfectly automatic in its action and may be depended on for accurate and rapid weighing.

What I claim as my invention, and desire to secure by Letters Patent, is—

1. In an automatic scale, the combination of a vibrating beam, a carriage movable thereon, a stationary hopper or hoppers, and two weighing or movable hoppers pivoted in said carriage, one upon each side of the center of vibrations of said beam and adapted to be brought alternately under the stationary hopper or hoppers by the movements of said carriage to receive their load, substantially as specified.

2. In an automatic scale, the combination of a vibrating beam, a single carriage movable thereon, adjustable stops for limiting the movements of said carriage in either direction, a stationary hopper or hoppers, and two weighing or movable hoppers pivoted in said carriage, one upon each side of the center of vibration, and adapted to be brought alternately under the stationary hopper or hoppers by the movement of said carriage to receive their load, substantially as specified.

3. The combination, with the vibrating beam and the wheeled carriage, with its pivoted weighing-hoppers, of the stationary hopper provided with outlets and the swinging valves or gates pivoted above said outlets and adapted to be swung bodily to open said outlets by the impact of said carrige or devices projecting therefrom, substantially as specified.

4. The combination of the vibrating beam B B', the wheeled carriage C, provided with rigid downwardly-projecting arms $C^3$ connected by cross-rods $i$, the pivoted weighing-hoppers D, the swinging valves or gates $h$, and the pivoted trip-levers F, all substantially as specified.

BERNHARD C. MEYER.

Witnesses:
ISOM WOOD,
NOAH COOK.